United States Patent [19]
Dillard et al.

[11] 3,775,770
[45] Nov. 27, 1973

[54] METHOD AND MEANS FOR PERFORMING DISTRIBUTION-FREE DETECTION OF SIGNALS IN NOISE

[75] Inventors: George M. Dillard, San Diego; Charles E. Antoniak, El Cerrito, both of Calif.

[73] Assignee: The United States of America as represented by the Secretary of the Navy, Washington, D.C.

[22] Filed: Mar. 31, 1972

[21] Appl. No.: 240,065

[52] U.S. Cl. .......... 343/100 CL, 325/323, 343/7 A, 343/7.7
[51] Int. Cl. ............................................. H04b 1/10
[58] Field of Search...................... 343/7.7, 100 CL, 343/7 A; 325/323

[56] References Cited
UNITED STATES PATENTS

| | | | |
|---|---|---|---|
| 3,359,409 | 12/1967 | Dryden | 343/100 CL |
| 3,441,724 | 4/1969 | Taylor, Jr. | 343/100 CL |
| 3,694,752 | 9/1972 | Gibson | 325/323 |
| 3,302,162 | 1/1971 | Rowlands | 343/7.7 |

Primary Examiner—Benjamin A. Borchelt
Assistant Examiner—G. E. Montone
Attorney—R. S. Sciascia et al.

[57] ABSTRACT

Input data representative of a variable environment including both signals and noise is delayed by multiple equal delay increments to generate identical multiple versions in delayed form, the time period of the delay increments being chosen to produce delayed data that are statistically independent. A selected version of the input data is compared with each other version, including the delayed data, in multiple comparators each of which is operative to produce first and second outputs indicating that either the input data is (1) equal to or greater in amplitude than the delayed data, or that (2) the input data is less in amplitude than the delayed data, respectively. The outputs of all comparators are summed and the sum is sampled at a rate such that the samples are statistically independent. The samples are then summed and compared with a predetermined threshold to indicate the presence or absence of signal in the input data.

9 Claims, 4 Drawing Figures

METHOD AND MEANS FOR PERFORMING DISTRIBUTION-FREE DETECTION OF SIGNALS IN NOISE

CROSS REFERENCE TO RELATED PATENT

The subject matter of the present invention, particularly as to its objective, is related generally to U. S. Pat. No. 3,614,626, titled "RADAR DETECTOR SYSTEM," filed Jan. 25, 1966 and issued Oct. 19, 1971 in the name of George M. Dillard, one of the coinventors of the invention disclosed and claimed herein.

BACKGROUND OF THE INVENTION

The problem of accurately detecting the presence of signal information in a background of noise and other variable environmental interference is a continuing one which has initiated many different, variant approaches in attempts at its solution. For example, many previous methods employ forms of automatic gain control (AGC) circuits designed to adjust detection thresholds and/or amplifier gain automatically in order to follow changes in a variable environment developing unwanted and undesirable interference including noise. One of the major disadvantages of this approach arises from the fact that the noise level can, at best, only be estimated on the basis of past information. Thus, there is a likelihood of an error being associated with the estimate and consequently a system based on such estimates can produce "false alarms". The term "false alarms" as used in relation to detection systems can be defined as an indication from the system that a signal is present when, in fact, no signal is present in the input data.

Alternatively, some prior art equipments used an estimated average noise level to control the detection threshold (or the quantization level in the case of binary integration) rather than the gain of the receiver. Systems using this type of feedback are called "constant false alarm systems".

It can be shown that the false alarm probability is a function of the ratio of the true average noise power to the estimated average noise power. It is possible that the false alarm probability can be approximately 10 times larger than desired when the ratio of true average noise power to estimated average noise power is only 1.1, i.e., when the true average noise power is less than one-half db larger than the estimated average noise power. Such an increase in false alarm rate could cause serious problems in many circumstances where radar or communication signal detection techniques are employed.

Controlling the false alarm rate by many of the prior art procedures results in decreasing the probability of detection. The extent to which the probability of detection is decreased depends both upon the particular procedure being used (e.g. binary integration and AGC) and on the changes which the probability distributions undergo. Hence, it is highly desirable that any detection system be "distribution-free", that is to say, that a constant false alarm rate be maintained despite changes in underlying distributions of the observed data.

The previously referenced patent employs a distribution-free criteria to indicate either the presence or absence of signals in an environment of noise and other unwanted interference. That technique involves the pre-recording of a source of known noise data which is converted to digital form for comparison with signal analog input data which is similarly converted to digital form. One of the disadvantages of this type of system is its reliance upon recorded known noise data which is necessarily past information and does not readily accommodate to a situation where the type, amplitude, or other characteristics of the noise environment will change in one or more ways.

Accordingly, it is desirable that a distribution-free method and technique for the detection of signal in a variable environment while maintaining a constant false alarm rate be devised and designed to use noise information derived from the variable environment and reflecting all changes in the characteristics of such noise as they occur.

SUMMARY OF THE INVENTION

The concept of the present invention obviates many of the most undesirable disadvantages of prior art systems because it contemplates the use of actual noise environmental data as they occur rather than relying upon past noise information for comparison purposes and the determination of the existence or non-existence of a signal. Thus, in the employment of the present invention, the false alarm probability is controlled in an absolute sense, and inherently by reason of the nature of the inventive concept in contrast to prior art systems wherein the false alarm probability was controlled adaptively by feedback loops or automatic gain control circuits employing past noise information.

The present invention employs noise information as it is currently generated and therefore may be said to advantageously utilize dynamic noise information as it occurs in the environment wherein it is sought to detect signals.

Moreover, the present invention is conceived to enable the approximation of optimal detector performance in artibrary noise environments; i.e., when no signal is present, no assumptions about the statistical distribution of the noise is necessary to ensure a constant false alarm rate.

Additionally, the concept of the present invention inherently obtains and maintains constant false alarm rate by comparing incoming data with time-adjacent data in reaching decisions as to the presence or nonpresence of signal.

According to the concept of the present invention, its method and system may be employed typically with pulsed radar equipment or with communication equipments. Typically, sequential input data may be received in its IF form and the envelope of the IF input data is developed by a suitable means such as a square law rectifier. The sequential input data in its rectified form is fed into a delay means such as a tapped delay line which develops multiple identical versions of the input data in delayed form by impressing substantially equal additional delay increments upon the input data. The delayed data in multiple form are derived from the taps of the delay line.

The time period of the delay increments between sequential delayed versions of the input data is chosen to produce delayed data that are "statistically independent". The term "statistically independent" as used herein may be defined as follows:

The delayed data are statistically independent if the probability of the simultaneous occurrence of individual delayed datum values is equal to the product of the probabilities of occurrence of each individual datum values. That is, if the delayed data is denoted by $X_1, X_2, \ldots, X_n$, they are said to be statistically independent if the probability that $Xhd\ 1 = a_1$ and $X_2 = a_2, \ldots,$ and $X_N = a_N$ is equal to the probability that $X_1 = a$, times the probability that $X_2 = a_2, \ldots,$ times the probability that $X_N = a_N$.

In a radar system, for example, statistically independent multiple data would be developed by employing delay increments of substantially $t = \frac{1}{2}B$, where B is the video bandwidth of the IF amplifier.

Multiple comparators are provided for comparing a selected version of the input data with each other version, including its multiple delayed forms. Each comparator is operative to produce a first or a second output indicative that either the input data is (1) equal to, or greater in amplitude than the data with which it is compared, or that it is (2) less in amplitude than the data with which it is compared, respectively.

The number of comparators is one less than the number of versions of the input data including its original form as well as its delayed forms. That is to say that, if the delay line has 20 taps in number, including the original undelayed input data from the first tap, the number of comparators required will be 19.

A suitable summing means is provided to accept the outputs of all the comparators for producing the sum of those outputs. The sum of the outputs is sampled by a sampling means at a rate such that the samples are also statistically independent in the sense as defined hereinbefore.

A second summing means is provided for summing the samples and a final comparator compares the sum of the samples with a predetermined threshold to determine the presence or absence of a signal in the input data. When the sum of the samples has a value in excess of the predetermined threshold, the presence of a signal in the input data is indicated.

The present invention has the advantage of being readily adaptable to operation in both analog and digital modes including a non-binary digital mode as well as a binary digital mode. The non-binary digital mode may be characterized as a "rank-sum" procedure whereas the binary digital mode of the operation of the present invention may be referred to as a "rank-quantization" procedure.

Accordingly, it is a primary object of the present invention to provide a method and means of detecting signals in a variable environment while maintaining a constant false alarm rate.

Another most important object of the present invention is to maintain such a constant false alarm rate as an inherent characteristic function of its operation without readjustment of system parameters.

A further most important object of the present invention is to devise a system and a method of detecting signals in a variable environment without reliance upon past information such as pre-recorded noise data. Another most important object of the present invention is to provide a method and system for detecting signals in a variable environment which utilizes current input data, including any of its dynamic changes, as a source of noise information for comparison with time adjacent data to determine the presence or absence of signal in that variable environment.

An ancillary and equally important object of the present invention is to employ the current data in the determination of the existence or non-existence of signal under severe environmental conditions employing the dynamic changes of such environmental conditions to produce a constant false alarm rate notwithstanding such dynamic changes in the environmental data.

These and other features, objects, and advantages of the present invention will be better appreciated from an understanding of the operative principles of a preferred embodiment as described hereinafter and as illustrated in the accompanying drawings.

DESCRIPTION OF THE PREFERRED EMBODIMENTS

Figure 1:
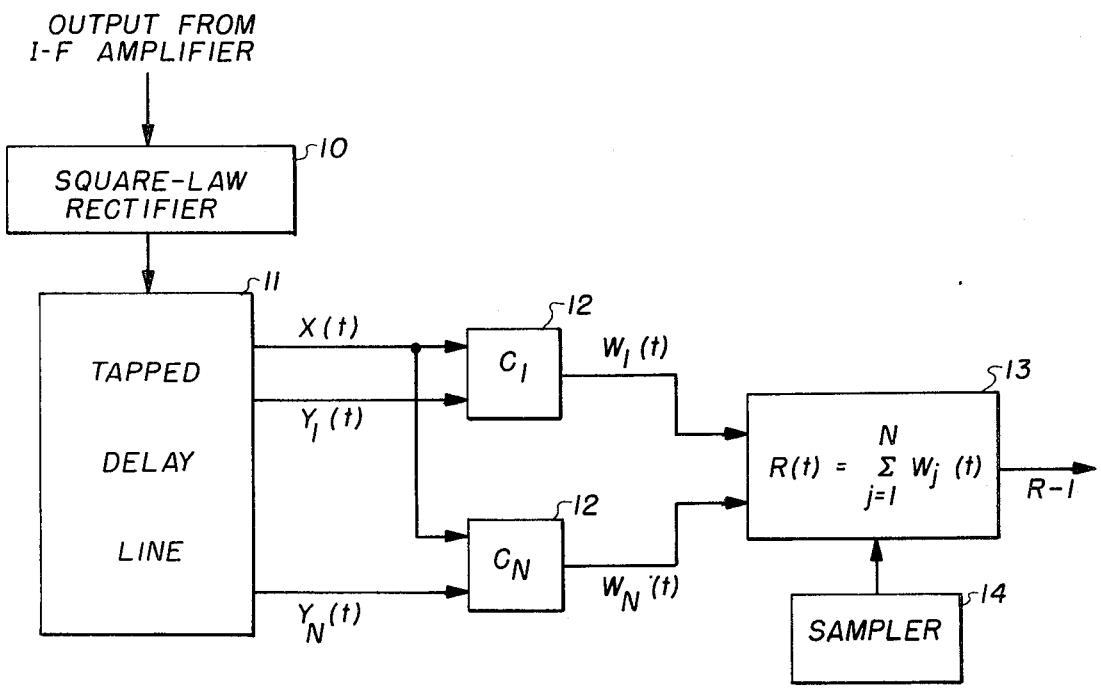
FIG. 1 is a schematic block diagram of an embodiment of the present invention including elements which are common to both its analog and digital mode of operation.

FIG. 1 is a schematic block diagram of those portions of an embodiment of the present invention which may be adapted to operate in either the analog or digital modes. Input data, as produced from a variable environment including noise, may be received in a radar equipment, for example, or communications equipment and must be processed by a system for detecting signals with a high degree of reliability, i.e., a constant false alarm rate. Such signals may typically be received from an IF amplifier as the input to a suitable rectifier 10 such as the square law rectifier illustrated in FIG. 1. The rectifier 10 produces an envelope of the IF frequency which provides the raw input data to a delay means 11, such as a tapped delay line, for example. The delay means 11, by reason of its multiple taps, develops multiple identical delayed data from the input data which it receives. This is accomplished by impressing substantially equal additional delay increments upon the input data as it proceeds along the delay line for developing the multiple delayed data from the delay means taps.

In accordance with the concept of the present invention it is essential that the time period of the delay increments between the taps of the delay means 11 be chosen to produce data that are statistically independent.

A selected version of the input data, either in its delayed form as represented by $Y_1(t) \ldots Y_N(t)$ in FIG. 1, or in its original and undelayed form, such as represented by $X(t)$, is compared with each other version of the same data.

In the illustration of FIG. 1, $X(t)$ is chosen to be compared with each delayed version of the input data. However, the selection of any other version would be acceptable within the concept of the present invention for comparison with each other version of the input data.

The comparison is accomplished by a plurality of comparators 12 as represented by $C_1$ through $C_N$ in FIG. 1. A requisite property of the comparators is that the output $W_j(t)$ from such a comparator, $C_j$ be a logical "0" if $X(t) < Y_j(t)$, and a logical "1" if $X(t) \geq Y_j(t)$.

The comparators are one less in number than the number of versions which are produced of the original input data. That is to say that, if a tapped delay line is provided as the delay means 11 and has 20 taps, including one undelayed version of the input data in the form, $X(t)$, and 19 additional versions of the input data, each delayed by an additional incremental amount, the total number of versions of the input data are 20 and thus require 19 comparators.

The outputs of all the comparators 12, as represented by the legend $W_1(t)$ through $W_N(t)$ in FIG. 1, are connected to the input of a summing means 13. Accordingly, the outputs $W_j(t)$ are summed to obtain $$R(t) = \sum_{j=1}^{N} W_j(t).$$

This summation may be performed by conventional digital circuitry which accepts the N inputs $W_1(t), \ldots$ through, $W_N(t)$ for producing an output which equals (or may be a voltage proportional to) the number of inputs which are a logical "1".

Under control of a sampling means 14, the sum $R(t)$ is sampled at time $t_0$ which corresponds to the time at which the data of interest appears at the delay line tap designated $X(t)$ in FIG. 1. For example, in a pulsed radar system the time $t_0$ may correspond to the time at which the return from a target at some fixed range would be received at the radar antenna. The sum $R(t_0)$ is one less than the rank of $X(t_0)$ with respect to $Y_1(t_0)$, $\ldots$, $Y_N(t_0)$. That is to say that, $R(t_0)$ is the number of $Y_j(t_0)$'s that are exceeded by $X(t_0)$.

Signal detection based on some function $R_i(t_0)$, $i = 1$, $\ldots n \ldots$ has the property that a constant false alarm rate is maintained notwithstanding changing environments, including fluctuations in noise amplitude and other undesirable interferences. (The subscript "i" is used to index the values of $R(t_0)$ obtained, for example, on successive pulses from a pulsed radar.)

It is important to note that the sampling of the sum $R(t)$ is accomplished at a rate having uniform time intervals such that the samples are statistically independent in the sense defined hereinbefore.

In accordance with the concept of the present invention, the samples are summed and compared with a predetermined threshold for determining the presence of absence of a signal as determined by whether each sum of the samples has a value in excess of the predetermined threshold, or not. This summation and comparison may be accomplished in a number of ways, one of which is the non-binary digital mode. The outputs $R_i$ are summed for M successive observations in the summing means 13 as illustrated in both FIGS. 1 and 2, to produce, as indicated in FIG. 2, $$A = \sum_{i=1}^{M} R_i.$$

Figure 2:
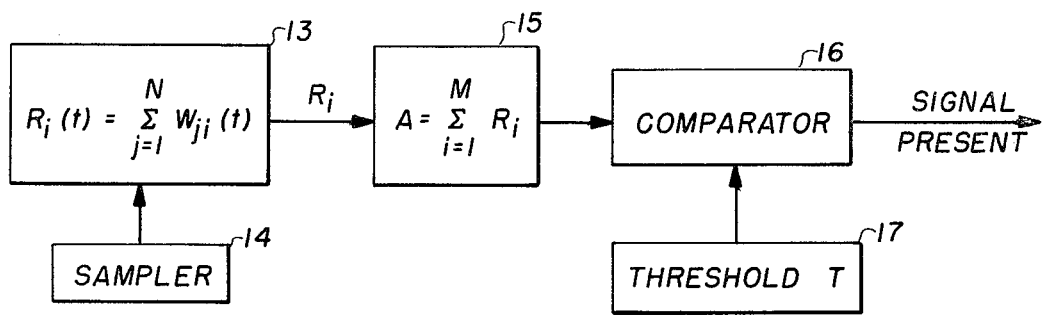
FIG. 2 is a schematic block diagram of that portion of an embodiment of the present invention when it is adapted to operate in the non-binary digital mode.

This is accomplished in an additional summing means 15 as illustrated in FIG. 2.

The number M of values $R_i$ that are summed is determined, for example, in a radar system by the number of pulses transmitted by a pulsed radar at a given antenna beam position and involves a decision which is arrived at from several parameters of the system including pulse repetition frequency, the beam width, and antenna drive rate.

The sum A is compared with an arbitrarily predetermined threshold T and if $A \geq T$, a signal is determined to be present at the range or time corresponding to $t_0$. This procedure may be designated the "rank-sum" procedure, and is described and analyzed in a paper titled "DISTRIBUTION-FREE DETECTION IN RADAR WITH MULTIPLE RESOLUTION ELEMENTS" by Charles A. Antoniak, George M. Dillard and Roger A. Shorack published in *SWIEEECO RECORD*, (Proceedings of the SOUTHWEST IEEE CONFERENCE, April 1967.)

Figure 3:
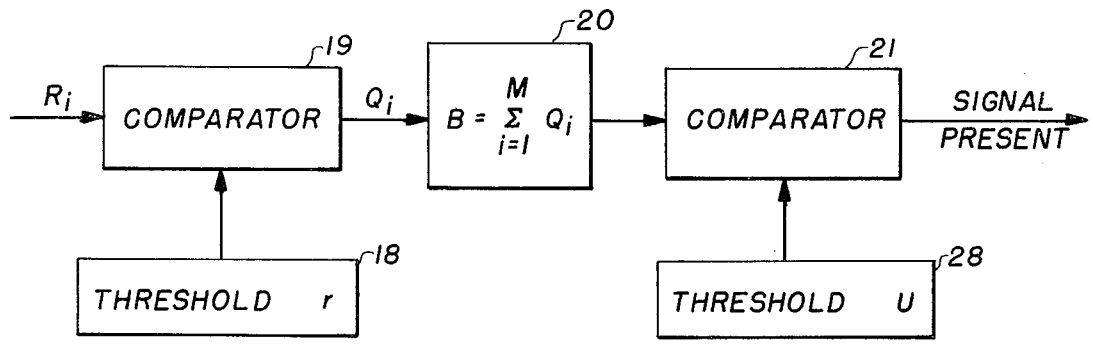
FIG. 3 is a schematic block diagram of that portion of the embodiment of the present invention when it is adapted to operate in a binary digital mode.

The concept of the present invention is such that it is readily adaptable to operation in a binary digital mode as well as a non-binary digital mode as described immediately hereinbefore. An arrangement of equipment suitable for adapting the present invention to operation in a binary digital mode is illustrated in FIG. 3. As illustrated in FIG. 3, the outputs $R_i$ and a threshold $r$, derived from the threshold element 18, are compared in a comparator 19. The comparator 19 produces a quantized output $Q_i$ indicated in the schematic block diagram of FIG. 3. $Q_i$ is assigned the value "1" if $R_i$ is $\geq R$; $Q_i$ is assigned the value "0" otherwise.

The $Q_i$ values, thus quantized, are summed for M successive observations to obtain the sum B;

$$B = \sum_{i=1}^{M} Q_i$$

The sum B is then compared in a comparator 21 with a threshold U derived from element 22, and a signal is deemed to be present in the input data if B U. This procedure may be designated as "rank-quantization" and is also described in the previously referenced technical paper.

Figure 4:
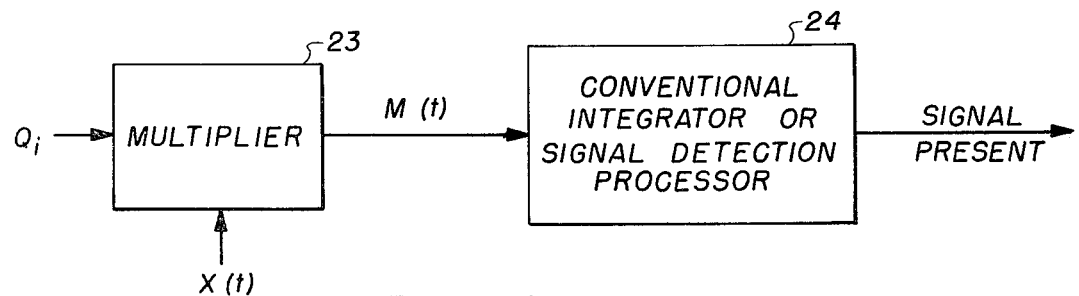
FIG. 4 is a schematic block diagram of that portion of an embodiment of the present invention when it is adapted to operate in its analog mode.

FIG. 4 schematically illustrates a combination of equipment adapted to be employed with an embodiment of the present invention for its operation in the analog mode. The output $Q_i$, as developed in the previously described binary digital mode, is fed into a multiplier 23 as illustrated in FIG. 4. A second input to the multiplier 23 is in the form of the output $X(t)$ from the delay means 11 shown in FIG. 1, i.e., that output from the delay means which is common to all the comparators, $C_1 \ldots C_N$. The output $M(t)$ of the multiplier 23 is $X(t)$ if $Q_i = 1$, and is O volts if $Q_i$ is O. Thus, the output of the multiplier 23 is the voltage $X(t)$ if $X(t)$ exceeds some fixed proportion of the voltages from the other N delay-line taps, and is O volts otherwise.

The output $M(t)$ is then integrated or summed for M successive observations in any conventional manner by an appropriate integrating means 24 and provides the basis for decisions and determination as to the presence of signals based on the integrated value.

Alternatively, the output $M(t)$ can be fed into the input of a cathode ray tube display and the "integration" performed by the visual persistence characteristic of the phosphor on the face of the CRT.

Those knowledgeable and skilled in the pertinent arts will appreciate that one of the prime advantages of the present invention over prior art techniques and methods is that the false alarm probability of the present invention is inherently controlled in an absolute sense by reason of its concept; that is to say, the present invention does not depend for control of its false alarm probability upon adaptive feedback loops or automatic gain circuits utilizing past information.

Rather an inherent and essential element of the concept of the present invention is its use of current information dynamically developed in real time.

Moreover, the system and method of the present invention enables the approximation of optimal detector performance in arbitrary noise environments; i.e., when no signal is present, no assumptions about the statistical distribution of the noise is necessary to ensure the constant false alarm rate.

Obviously many modifications and variations of the present invention are possible in the light of the above teachings. It is therefore to be understood that within the scope of the appended claims the invention may be practiced otherwise than as specifically described.

What is claimed is:

1. A system for detecting signals in a variable environment including noise comprising:
    means for receiving sequential input data representative of said variable environment;
    delay means for developing multiple delayed data from said input data by impressing substantially equal additional delay increments upon said input data, the time period of said delay increments being chosen to produce delayed versions of said input data that are statistically independent;
    multiple comparators for comparing a selected version of said input data with each other version of said data including said multiple delayed data, said comparators being one less in number than the number of versions of said data including its original and delayed forms, and each said comparator being operative to produce a first output indicating that said selected version of said input data is equal to or greater in amplitude than the other data with which it is compared, and a second output indicating said selected version of said input data is less in amplitude than the other data with which it is compared;
    means for summing the outputs of all said comparators;
    means for sampling the sum of said outputs at a sampling rate such that samples are statistically independent;
    means for summing the said samples; and
    means for comparing the said sum of said samples with a predetermined threshold, whereby a sum of samples having a value in excess of the threshold indicates the presence of a signal in said input data.

2. A system as claimed in claim 1 and including:
    means for accumulating the sums of the outputs of said comparators for successive input data periods; and
    a comparator for receiving and comparing the accumulated sums with a selected threshold for determining the presence or absence of signal in said input data.

3. A system as claimed in claim 2 wherein said input data is derived from a radar system and said threshold is selected in accordance with known parameters of the radar system including pulse repetition frequency, beam width, and antenna drive rate.

4. A system as claimed in claim 1 and including:
    means for comparing successive sums of the outputs of said comparators for producing quantized outputs as determined by the amplitude of each successive sum relative to a selected threshold;
    means for accumulating said quantized outputs over a predetermined time period; and
    comparator means for comparing the accumulated quantized with a known threshold for determining the presence of signal in said input data.

5. A system as claimed in claim 1 and including:
    means for comparing successive sums of the outputs of said comparators for producing quantized outputs as determined by the amplitude of each successive sum relative to a selected threshold;
    multiplier means for multiplying the input data by each quantized output; and
    means for integrating the outputs of said multiplier over a predetermined time period for determining the presence of signal during said time period.

6. A method for detecting signals in a variable environment including noise comprising the steps of:
    delaying received sequential input data representative of the variable environment by substantially equal and additional delay increments for developing multiple delayed data, the time period of the delay increments being chosen to produce multiple versions of the input data which are statistically independent;
    comparing a selected version of the data with each other of the multiple versions of the data for producing a first output indicative that the selected data is equal to or greater in amplitude than the other data with which it is compared, and a second output indicative that the selected data is less in amplitude than the data with which it is compared;
    summing the outputs of all the comparators;
    sampling the sum of the outputs at a sampling rate such that the samples are statistically independent;
    summing the samples; and
    comparing the sum of the samples with a predetermined threshold whereby a sum of samples having a value in excess of the threshold indicates the presence of signal in the input data.

7. A method for detecting signals in a variable environment including noise as claimed in claim 6 and also including the steps of:
    accumulating the sums of the outputs of the comparators for successive input data periods; and,
    comparing the accumulated sums with a selected threshold to determine the presence or absence of signal in the input data.

8. A method of detecting signals in a variable environment including noise as claimed in claim 6 and also including the steps of:
    comparing successive sums of the outputs of the comparators for producing quantized outputs as determined by the amplitude of each successive sum relative to a selected threshold;
    accumulating the quantized outputs over a predetermined time period; and
    comparing the accumulated quantized outputs with a known threshold for determining the presence of signal in the input data.

9. A method of detecting signals in a variable environment including noise as claimed in claim 6 and also including the steps of:
comparing successive sums of the outputs of the comparators for producing quantized outputs as determined by the amplitude of each successive sum relative to a selected threshold;
multiplying the input data by each quantized output; and
integrating the outputs of the multiplier over a predetermined time period for determining the presence of signal during that time period.

* * * * *